United States Patent
Choi

(10) Patent No.: US 11,285,796 B2
(45) Date of Patent: Mar. 29, 2022

(54) VEHICLE BODY STRUCTURE AND VEHICLE INCLUDING THE SAME

(71) Applicants: HYUNDAI MOTOR COMPANY, Seoul (KR); KIA MOTORS CORPORATION, Seoul (KR)

(72) Inventor: Jiho Choi, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 207 days.

(21) Appl. No.: 16/662,574

(22) Filed: Oct. 24, 2019

(65) Prior Publication Data
US 2020/0406734 A1 Dec. 31, 2020

(30) Foreign Application Priority Data
Jun. 26, 2019 (KR) .................. 10-2019-0076366

(51) Int. Cl.
*B60K 1/04* (2019.01)
*B62D 21/15* (2006.01)

(52) U.S. Cl.
CPC .............. *B60K 1/04* (2013.01); *B62D 21/155* (2013.01); *B60K 2001/0433* (2013.01); *B60K 2001/0438* (2013.01)

(58) Field of Classification Search
CPC .............. B60K 1/04; B60K 2001/0416; B60K 2001/0433; B60K 2001/0438; B62D 21/155; H01M 50/20; H01M 50/249; H01M 50/204; H01M 50/244
See application file for complete search history.

(56) References Cited

U.S. PATENT DOCUMENTS

| | | | | |
|---|---|---|---|---|
| 8,905,171 B2 * | 12/2014 | Lee | .......................... | B60L 50/60 |
| | | | | 180/68.5 |
| 9,956,861 B2 * | 5/2018 | Nomura | ................... | B60K 6/28 |
| 9,987,912 B2 * | 6/2018 | Shinoda | ............. | B62D 25/2027 |
| 10,358,048 B2 * | 7/2019 | Hara | .......................... | B60K 1/04 |
| 10,632,847 B2 * | 4/2020 | Yokoyama | .............. | B60L 50/66 |
| 10,864,810 B2 * | 12/2020 | Sopel | ....................... | B60L 50/61 |
| 2013/0299257 A1 | 11/2013 | Erlacher et al. | | |

FOREIGN PATENT DOCUMENTS

| | | |
|---|---|---|
| JP | 2004345448 A | 12/2004 |
| JP | 2015077896 A | 4/2015 |
| JP | 2017165303 A | 9/2017 |
| JP | 2018176858 A | 11/2018 |

* cited by examiner

*Primary Examiner* — John D Walters
(74) *Attorney, Agent, or Firm* — Lempia Summerfield Katz LLC

(57) ABSTRACT

A vehicle body structure for a vehicle having a battery and a rear seat includes a battery mounting portion provided on a floor in the rear of the rear seat and on which the battery is mounted, a cross member configured to reinforce the floor in the front of the battery mounting portion, a lower reinforcement portion configured to reinforce the floor below the battery mounting portion and to be supported on the cross member and both side members, and an upper fixing portion fastened to the lower reinforcement portion in a state of fixing the battery. The vehicle body structure is configured to protect the battery by absorbing and distributing the load from a collision, and effectively utilize the space of the rear side of the vehicle for installing the battery with the rear seat, etc.

10 Claims, 6 Drawing Sheets

VEHICLE BODY STRUCTURE AND VEHICLE INCLUDING THE SAME

CROSS-REFERENCE TO RELATED APPLICATION

This application claims priority to and the benefit of Korean Patent Application No. 10-2019-0076366, filed on Jun. 26, 2019, which is incorporated herein by reference in its entirety.

FIELD

The present disclosure relates to a vehicle body structure and a vehicle including the same capable of mounting a large capacity battery.

BACKGROUND

The statements in this section merely provide background information related to the present disclosure and may not constitute prior art.

Vehicles that use an electric motor as a driving source, such as electric vehicles (EVs), hybrid electric vehicles (HEVs), and plug-in hybrid electric vehicles (PHEVs), include large-capacity batteries.

These vehicles are developed in various types of vehicles such as sedans, sports utility vehicles (SUVs), and multi-purpose vehicles (MPVs), and due to limited environmental regulations, there are restrictions on the installation of the battery depending on the types of the vehicles. The 5-seater sedan may be equipped with a battery at the rear (cargo space) of a second-row seat or at the bottom of the second-row seat. However, the SUVs and the MPVs have a difficulty in installing a large-capacity battery because a three-row or four-row seat is installed at the rear of the passenger space and a propeller shaft for a four-wheel drive (4WD) is applied.

Recently, the crash regulations for high capacity battery-mounted vehicles require security of a buffer space around the battery and design of a robust vehicle body structure so that the battery may be safely protected by reducing the impact on battery due to a vehicle crash.

The above information disclosed in this Background section is only for enhancement of understanding of the background of the present disclosure, and therefore it may contain information that does not form the prior art that is already known to a person of ordinary skill in the art.

SUMMARY

The present disclosure provides a vehicle body structure protecting a battery from a collision by increasing the rigidity of a battery mounting portion and securing a buffer area.

It is another aspect of the present disclosure to provide the vehicle body structure mounting a large capacity battery while reducing the occupancy of passenger and cargo spaces.

It is another aspect of the present disclosure to provide the vehicle body structure reducing the restrictions on the installation and movement of a rear seat despite the installation of a large capacity battery.

In accordance with an aspect of the present disclosure, a vehicle body structure for a vehicle having a battery and a rear seat includes a battery mounting portion provided on a floor in the rear of a rear seat and on which a battery is mounted, a cross member configured to reinforce the floor in the front of the battery mounting portion, a lower reinforcement portion configured to reinforce the floor below the battery mounting portion and to be supported on the cross member and both side members, and an upper fixing portion fastened to the lower reinforcement portion in a state of fixing the battery.

The battery mounting portion may include a recess formed to be recessed downward from the floor to receive a lower side of the battery.

The lower reinforcement portion may include a first reinforcement frame extending in a lateral direction at a position spaced apart from the rear of the cross member and having opposite ends supported by the both side members, a plurality of second reinforcement frames extending in a longitudinal direction to connect the cross member and the first reinforcement frame and disposed to be spaced apart from each other in the lateral direction, and third reinforcement frames provided on both sides to connect the both side members and the second reinforcement frames adjacent to the both side members between the cross member and the first reinforcement frame and extending in the lateral direction.

The first reinforcement frame may be provided at a position coincident with a rear end of the battery.

The vehicle body structure may further include a plurality of buffer frames supported on a rear bumper by extending in a rearward direction, respectively, from positions where the first reinforcement frame and the plurality of second reinforcement frames are connected, and made of a material having a weaker rigidity than the first and second reinforcement frames.

The upper fixing portion may include a first fixing frame extending in the lateral direction to fix the battery and having opposite ends fastened to the third reinforcement frames, a second fixing frame extending in the lateral direction to fix the battery and having opposite ends fastened to the first reinforcement frame, and a plurality of third fixing frames extending in the longitudinal direction to fix the battery, coupled to the first and second fixing frames in an intersecting state, and having a front end fastened to the plurality of second reinforcement frames, respectively.

The lower reinforcement portion may further include a plurality of reinforcement members provided in the first to third reinforcement frames to reinforce portions to which the first to third fixing frames are fastened, respectively.

The vehicle body structure may further include a plurality of seat rails installed on the floor to guide the movement of the rear seat and fastened to the first fixing frame in a state of extending to the first fixing frame.

The vehicle body structure may further include a plurality of seat rails installed on the floor to guide the movement of the rear seat and fastened to the upper fixing portion in a state of extending above the upper fixing portion.

The vehicle body structure may further include a plurality of buffer frames supported on a rear bumper by extending in a rearward direction from the lower reinforcement portion, respectively, and made of a material having a weaker rigidity than the lower reinforcement portion.

In accordance with another aspect of the present disclosure, a vehicle includes the vehicle body structure described above.

Further areas of applicability will become apparent from the description provided herein. It should be understood that the description and specific examples are intended for purposes of illustration only and are not intended to limit the scope of the present disclosure.

DRAWINGS

In order that the present disclosure may be well understood, there will now be described various forms thereof, given by way of example, reference being made to the accompanying drawings, of which:

Figure 1:
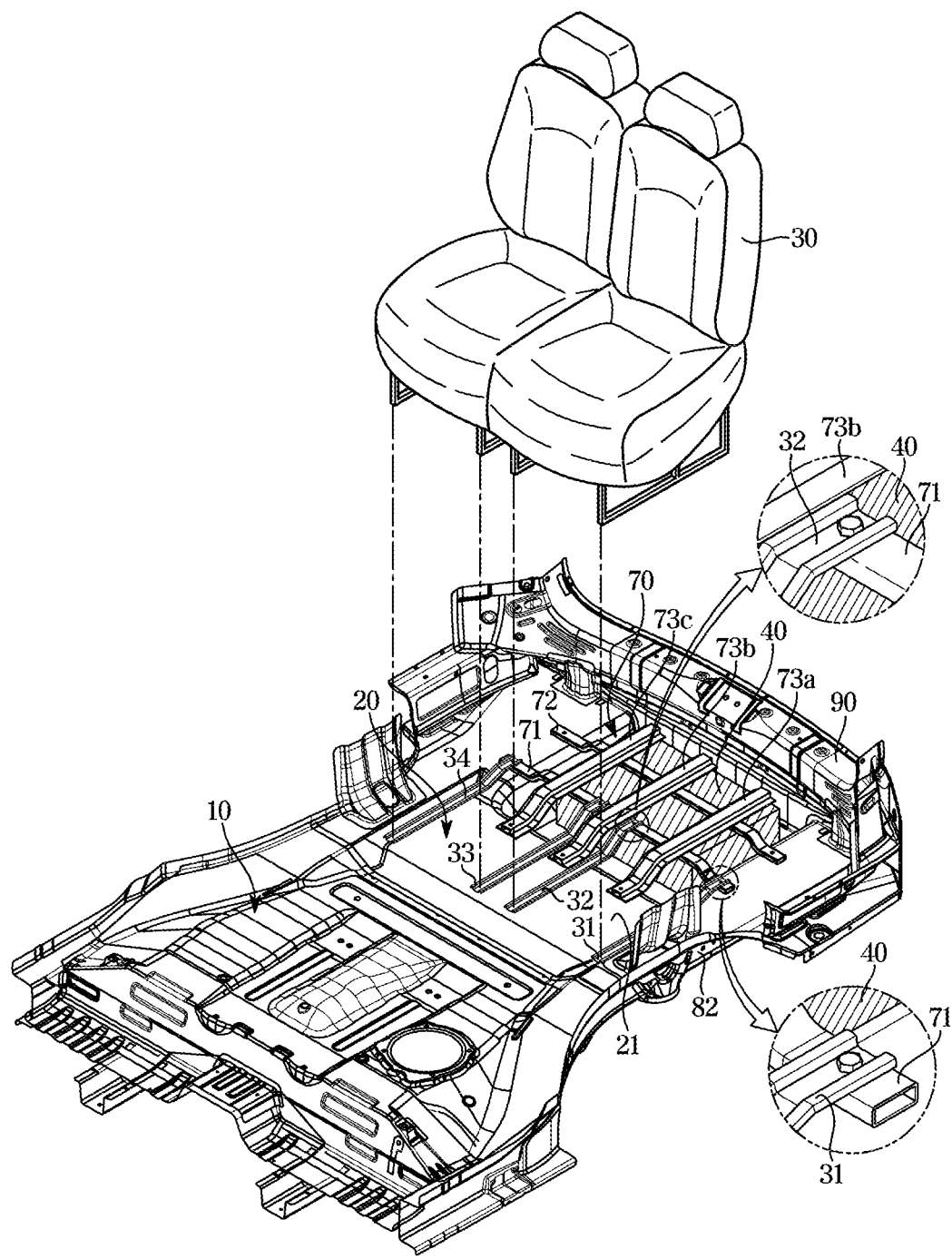
FIG. 1 is a perspective view of a vehicle body structure according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
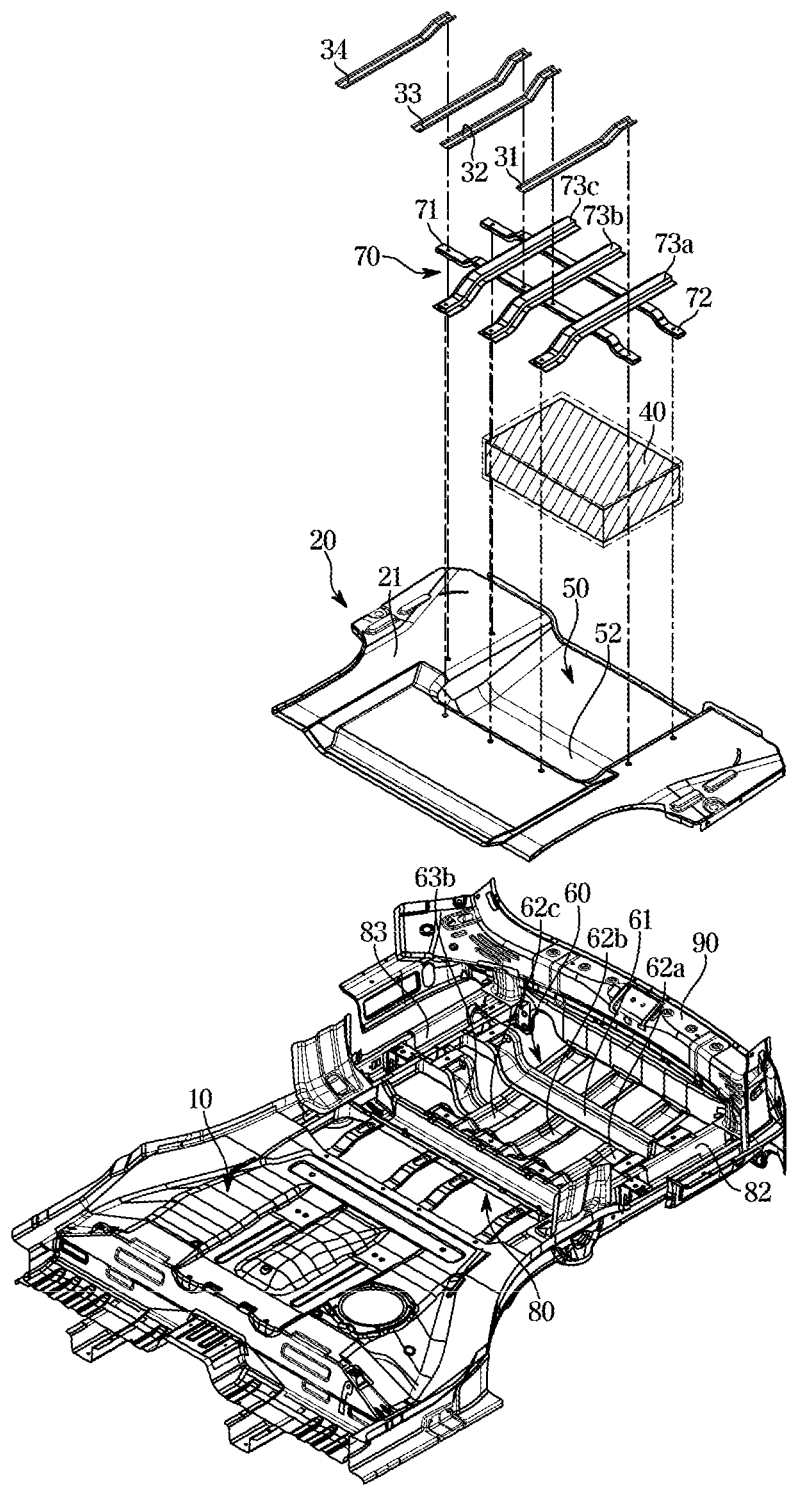
FIG. 2 is an exploded perspective view illustrating a configuration around a battery mounting portion of the vehicle body structure according to a form of the present disclosure.
Figure 3:
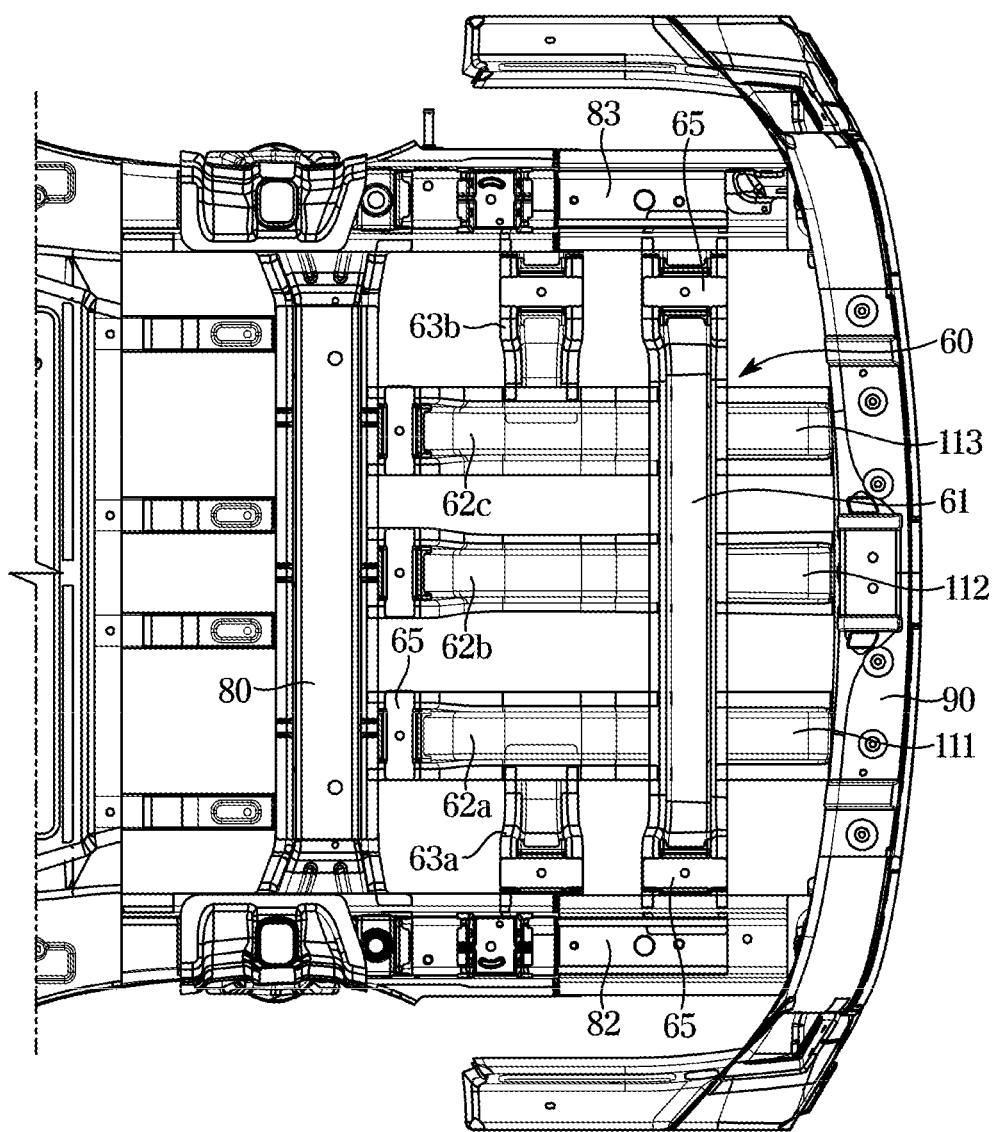
FIG. 3 is a plan view illustrating a lower reinforcement portion of the vehicle body structure according to a form of the present disclosure.

Referring to FIGS. 1 to 3, a vehicle body structure according to a form of the present disclosure includes a central floor 10 forming a floor of an indoor space, a rear floor 20 extending from a rear portion of the central floor 10, a battery mounting portion 50 provided on the rear floor 20 in the rear of a rear seat 30 to mount a battery 40 thereon, a lower reinforcement portion 60 provided to reinforce the rear floor 20 below the battery mounting portion 50, an upper fixing portion 70 provided above the battery 40 to fix the battery 40, a cross member 80 provided to reinforce the rear floor 20 in the front of the battery mounting portion 50, and a rear bumper 90 mounted to a rear end of the rear floor 20.

The rear seat 30 may be a seat installed at the rearmost portion of a passenger space. When the vehicle body structure according to the present form is applied to a SUV or MPV, the rear seat 30 may be a three-row or four-row seat, and when the vehicle body structure is applied to a small SUV having a first-row and second-row seats, the rear seat 30 may be a second-row seat.

The cross member 80 extends in a lateral direction and is connected at opposite ends to the left rear side member 82 and the right rear side member 83, respectively. The cross member 80 is supported by the left and right rear side members 82 and 83 at the opposite ends in a state of being attached to a lower surface of a rear floor panel 21 to increase the lateral direction rigidity of the rear floor 20.

Figure 6:
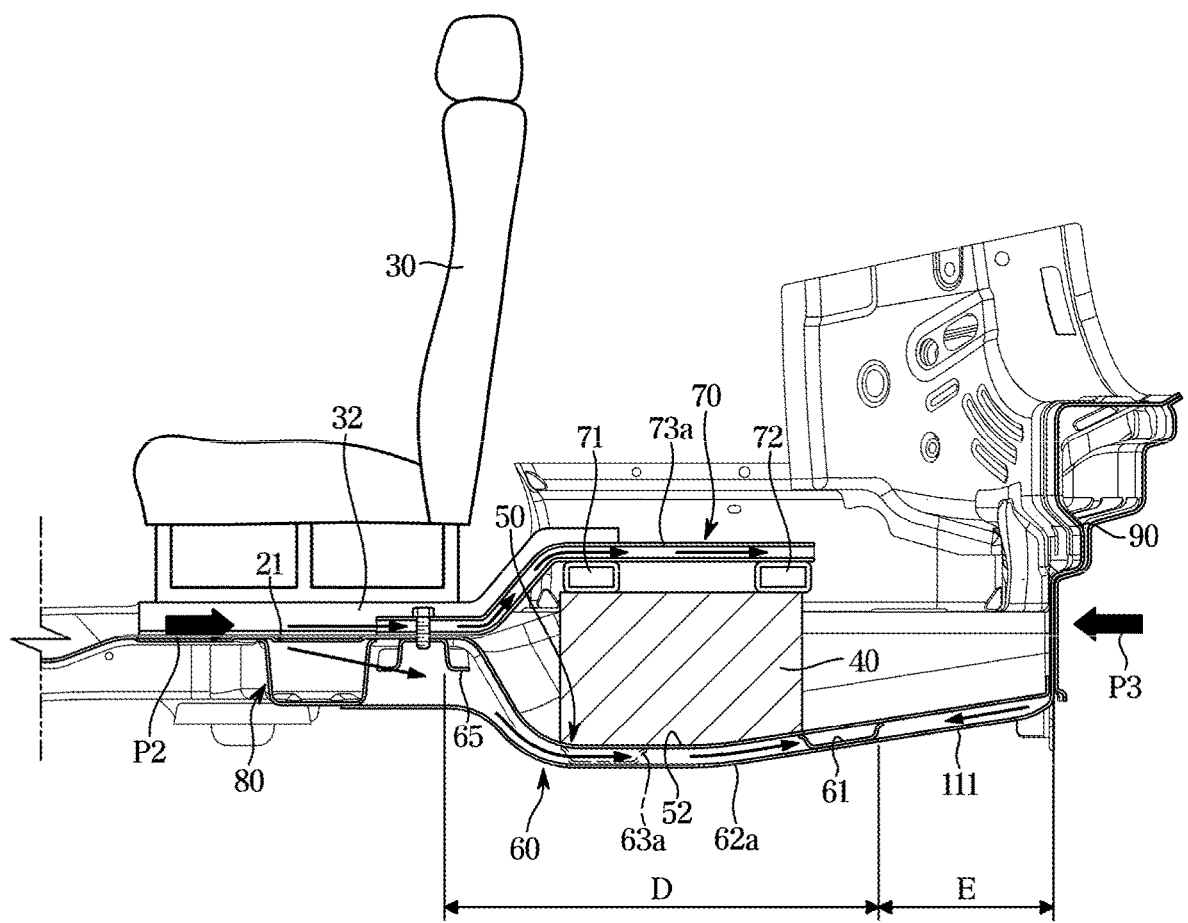
FIG. 6 is a cross-sectional view taken along line B-B' of FIG. 4.

As illustrated in FIGS. 2 and 6, the battery mounting portion 50 may be formed to be recessed to a predetermined depth downward from the surface of the rear floor panel 21 to receive a lower side of the battery 40. Specifically, the rear floor panel 21 in which the battery mounting portion 50 is positioned is provided with a recess 52 recessed downward to receive the lower side of the battery 40.

As illustrated in FIGS. 2 and 3, the lower reinforcement portion 60 is supported by the cross member 80, the left rear side member 82 and the right rear side member 83 positioned at the opposite ends of the cross member 80 in a state of being coupled to the lower surface of the rear floor panel 21 to increase a longitudinal direction rigidity and a lateral direction rigidity of the vehicle body structure.

As illustrated in FIG. 3, the lower reinforcement portion 60 may include a first reinforcement frame 61, a plurality of second reinforcement frames 62a, 62b, and 62c, and left and right third reinforcement frames 63a and 63b.

The first reinforcement frame 61 is provided at a position spaced rearward from the cross member 80 and extends in the lateral direction to be parallel to the cross member 80. Specifically, the first reinforcement frame 61 may be provided at a position coincident with a rear end of the battery 40. Opposite ends of the first reinforcement frame 61 are connected to the left and right rear side members 82 and 83, respectively.

The plurality of second reinforcement frames 62a, 62b, and 62c extend to connect the cross member 80 and the first reinforcement frame 61 and are arranged to be spaced apart from each other in the lateral direction. A front end and a rear end of the plurality of second reinforcement frames 62a, 62b, and 62c are supported by the cross member 80 and the first reinforcement frame 61, respectively, in a state of being spaced parallel to each other, thereby increasing the longitudinal direction rigidity of a lower portion of the battery mounting portion 50.

The left and right third reinforcement frames 63a and 63b extend in the lateral direction between the cross member 80 and the first reinforcement frame 61, and connect the left and right rear side members 82 and 83 and the second reinforcement frames 62a and 62c that are adjacent to the rear side members 82 and 83, respectively. The left third reinforcement frame 63a connects the left rear side member 82 and the left second reinforcement frame 62a that is adjacent to the left rear side member 82, and the right third reinforcement frame 63b connects the right rear side member 83 and the right second reinforcement frame 62c that is adjacent to the right rear side member 83.

The first reinforcement frame 61 and the left and right third reinforcement frames 63a and 63b increase the lateral direction rigidity of the lower portion of the battery mounting portion 50 by being supported on the left and right rear side members 82 and 83, respectively.

A plurality of buffer frames 111, 112, and 113 are installed between the rear bumper 90 and the first reinforcement frame 61 of the lower reinforcement portion 60. The plurality of buffer frames 111, 112, and 113 extend rearward from positions at which the first reinforcement frame 61 and the plurality of second reinforcement frames 62a, 62b, and 62c are connected, respectively, and are supported on the rear bumper 90. The plurality of buffer frames 111, 112, and 113 are made of a material having a weaker rigidity than the first and second reinforcement frames 61, 62a, 62b, and 62c.

As illustrated in FIG. 6, because the plurality of buffer frames 111, 112, and 113 are made of a material having a relatively weaker rigidity than the first and second reinforcement frames 61, 62a, 62b, and 62c and are located in the rear of the battery mounting portion 50, when a collision occurs from the rear thereof, the plurality of buffer frames 111, 112, and 113 may absorb energy while being deformed, thereby protecting the battery mounting portion 50.

As illustrated in FIG. 6, the vehicle body structure may include a high strength region D between the cross member 80 on which the battery mounting portion 50 is located and the first reinforcement frame 61, and a low strength region E between the rear bumper 90 and the first reinforcement frames 61.

Because the high strength region D includes the first reinforcement frame 61, the plurality of second reinforcement frames 62a, 62b, and 62c, and the left and right third reinforcement frames 63a and 63b, which have a relatively high rigidity, the high strength region D stably protects the battery 40 by suppressing deformation of the battery mounting portion 50. Because the low strength region E includes the plurality of buffer frames 111, 112, and 113 having a relatively low rigidity, the plurality of buffer frames 111, 112, and 113 absorb collision energy while being deformed when a collision occurs from the rear thereof.

In order to stably protect the battery 40 from a rear collision, it is appropriate that the first reinforcement frame 61 which forms a boundary between the high strength region D and the low strength region E, is disposed at a position coincident with the rear end of the battery 40 to secure the low strength region E (buffer region) having an enough size in the rear of the battery mounting portion 50.

Figure 4:
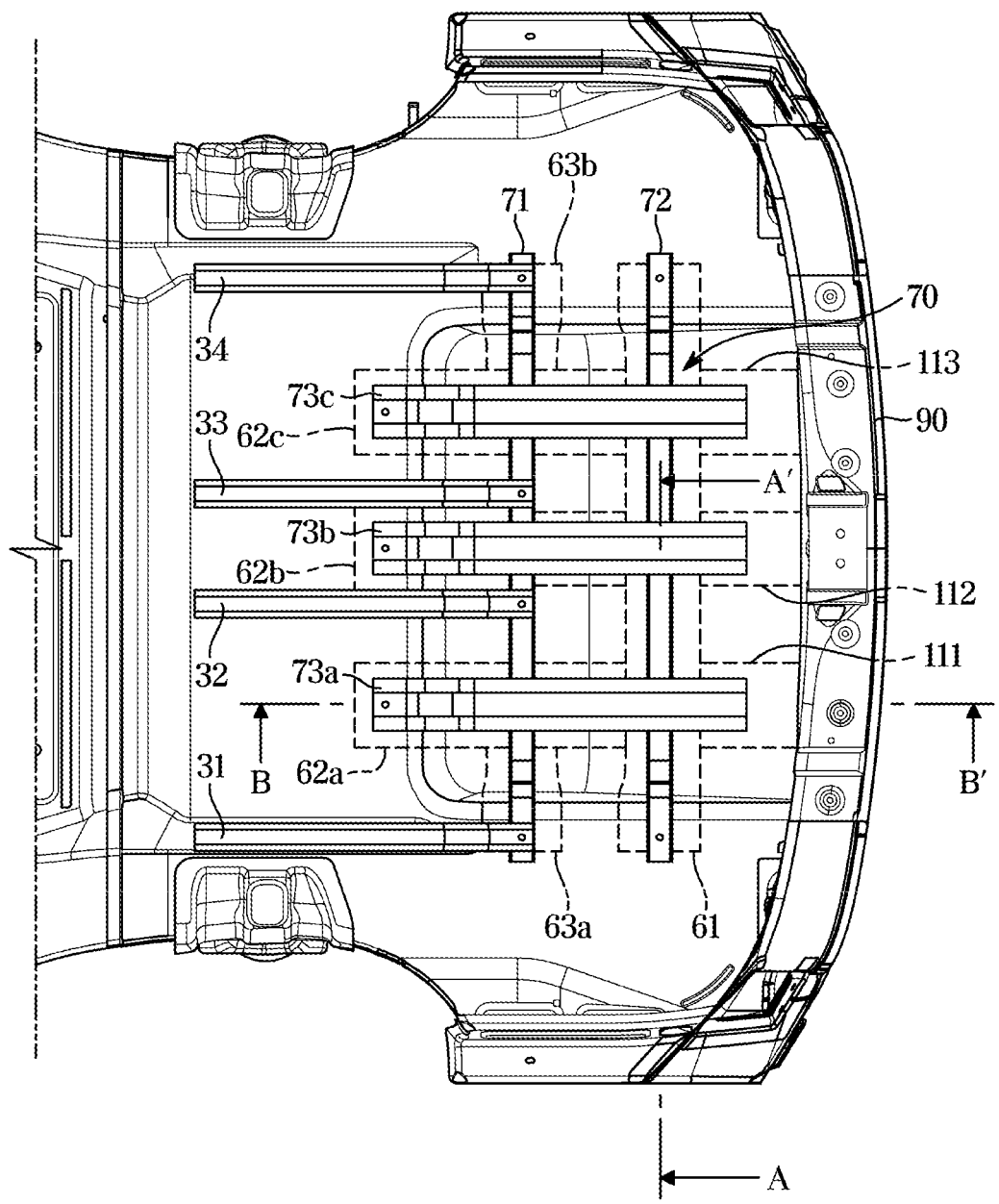
FIG. 4 is a plan view illustrating an upper coupling portion of the vehicle body structure according to a form of the present disclosure.

As illustrated in FIGS. 1, 2 and 4, the upper fixing portion 70 is fastened to the lower reinforcement portion 60 while fixing an upper outer surface of the battery 40 placed on the battery mounting portion 50.

The upper fixing portion 70 includes a first fixing frame 71 extending in the lateral direction to fix the battery 40 and having opposite ends fastened to the third reinforcement frames 63a and 63b, a second fixing frame 72 extending in the lateral direction to fix the battery 40 in the rear of the first fixing frame 71 and having opposite ends fastened to opposite ends of the first reinforcement frame 61, and a plurality of third fixing frames 73a, 73b, and 73c extending in a longitudinal direction to fix the battery 40, coupled to the first and second fixing frames 71 and 72 in an intersecting state, and having a front end fastened to the plurality of second reinforcement frames 62a, 62b, and 62c, respectively.

Figure 5:
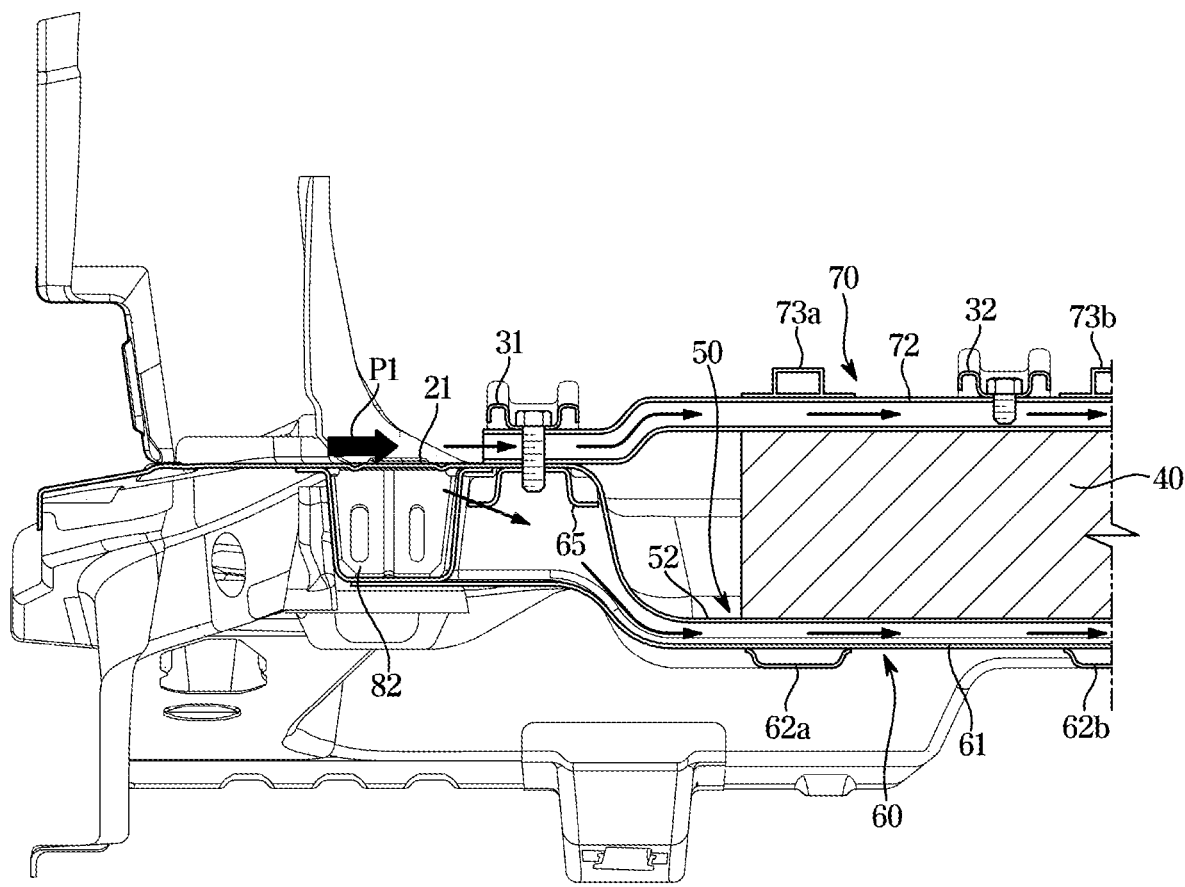
FIG. 5 is a cross-sectional view taken along line A-A' of FIG. 4.

As illustrated in FIGS. 4 and 5, the opposite ends of the first fixing frame 71 and the second fixing frame 72 are fastened to the first reinforcement frame 61 and the third reinforcement frame 63a and 63b in a state of fixing an upper portion of the battery 40, so that the first fixing frame 71 and the second fixing frame 72 increase the lateral direction rigidity of the vehicle body structure together with the first and third reinforcement frames 61, 63a, and 63b in addition to the function of fixing the battery 40.

As illustrated in FIGS. 4 and 6, the front end of the plurality of third fixing frames 73a, 73b, and 73c is fastened to the front end of the plurality of second reinforcement frames 62a, 62b, and 62c in a state of fixing the upper portion of the battery 40, so that the plurality of third fixing frames 73a, 73b, and 73c increase the longitudinal direction rigidity of the vehicle body structure together with the second reinforcement frames 62a, 62b, and 62c located below the third fixing frames 73a, 73b, and 73c in addition to the function of fixing the battery 40.

Referring to 5 and 6, the first to third fixing frame 71, 72, 73a, 73b and 73c of the upper fixing portion 70 each are fastened to the upper surface of the rear floor panel 21 at a position where the first to third reinforcement frames 61, 62a, 62b, 62c, 63a and 63b of the lower reinforcement portion 60 each are coupled to the rear floor panel 21. However, as with a general vehicle body structure, the first to third reinforcement frames 61, 62a, 62b, 62c, 63a, and 63b welded to the lower surface of the rear floor panel 21 may be regarded as having structurally a hollow rectangular cross sectional portion by including a portion of the rear floor panel 21 positioned above the first to third reinforcement frames 61, 62a, 62b, 62c, 63a, and 63b. Accordingly, the first to third fixing frames 71, 72, 73a, 73b, and 73c are regarded as being coupled to the first to third reinforcement frames 61, 62a, 62b, 62c, 63a, and 63b.

As illustrated in FIGS. 5 and 6, a reinforcement member 65 for increasing the rigidity of fastening portions may be installed in each of the first to third reinforcement frames 61, 62a, 62b, 62c, 63a, and 63b of a position where each of the first to third fixing frames 71, 72, 73a, 73b, and 73c is coupled. The reinforcement members 65 may be welded to the first to third reinforcement frames 61, 62a, 62b, 62c, 63a, and 63b or the lower surface of the rear floor panel 21 in a state of being received in the hollow rectangular cross sectional portion of the first to third reinforcement frames 61, 62a, 62b, 62c, 63a, and 63b.

As illustrated in FIGS. 4 and 5, because a lateral direction load P1 acting on a vehicle reaches the battery mounting portion 50 and then is distributed in and transmitted to the first and third reinforcement frames 61, 62a, 62b, 62c, 63a and 63b of the lower reinforcement portion 60 and the first and second fixing frames 71 and 72 of the upper fixing portion 70, the vehicle body structure may not only stably protect the battery 40 from a collision in the lateral direction, but may also increase the lateral direction rigidity.

Further, as illustrated in FIGS. 4 and 6, because a longitudinal direction load P2 acting from the front of the vehicle reaches the battery mounting portion 50 and then is distributed in and transmitted to the second reinforcement frames 62a, 62b and 62c of the lower reinforcement portion 60 and the third fixing frames 73a, 73b and 73c of the upper fixing portion 70, the vehicle body structure may not only stably protect the battery 40 from a collision in the longitudinal direction, but may also increase the longitudinal direction rigidity.

Further, as illustrated in FIG. 6, because the plurality of buffer frames 111, 112, and 113 having a weaker rigidity than the first and second reinforcement frames 61, 62a, 62b, and 62c absorbs energy while being deformed when a longitudinal direction load P3 is applied from the rear bumper 90 side, the battery 40 may be stably protected from a rear collision.

Referring to FIGS. 1, 2, and 4, a plurality of seat rails 31, 32, 33, and 34 for guiding the movement of the rear seat 30 while supporting the rear seat 30 (three-row or four-row seat) may be installed above the rear floor panel 21. The seat rails 31, 32, 33, and 34 extend longitudinally parallel to each other. A rear end of each of the seat rails 31, 32, 33, and 34 is fastened to the first fixing frame 71 after extending above the first fixing frame 71 of the upper fixing portion 70.

As such, when the plurality of seat rails 31, 32, 33, and 34 are coupled to the first fixing frame 71 fixing the upper portion of the battery 40, the weight of an occupant seated in the rear seat 30 and the rear seat 30 is transmitted to the first fixing frame 71 through the plurality of seat rails 31, 32, 33, and 34 to press the first fixing frame 71 in the downward direction. That is, the battery 40 may be pressed in the downward direction by the weight of the occupant seated in the rear seat 30 and the rear seat 30. Therefore, even if a front collision occurs in the vehicle, a phenomenon in which the battery 40 is lifted by inertia may be inhibited.

As illustrated in FIG. 6, because the vehicle body structure of the present form includes the battery mounting portion 50 provided at the rear of the rear seat 30 installed at the uttermost rear of the passenger space and the recess 52 recessed downward to receive the lower side of the battery 40 in the rear floor panel 21, the vehicle body structure may be equipped with the battery 40 having a large capacity while reducing the occupancy of the passenger space and a cargo space.

Further, because the battery mounting portion 50 is provided at the rear of the rear seat 30, the vehicle body structure of the present form may reduce the restrictions on the installation and movement of the rear seat 30 despite the installation of the battery 40 having a large capacity, and inhibit the interference between the propeller shaft (not shown) and the battery 40 when the 4WD is applied.

As described above, a vehicle body structure according to a form of the present disclosure can increase the rigidity of a battery mounting portion because the vehicle body structure includes a lower reinforcement portion and an upper fixing portion.

The vehicle body structure according to a form of the present disclosure can stably protect a battery from a collision because the lateral direction load P1 is distributed in and transmitted to first and third reinforcement frames of the lower reinforcement portion and first and second fixing frames of the upper fixing portion, and the longitudinal direction load P2 is distributed in and transmitted to second reinforcement frames of the lower reinforcement portion and third fixing frames of the upper fixing portion.

The vehicle body structure according to a form of the present disclosure can stably protect the battery from a rear collision because a plurality of buffer frames having a weaker rigidity than the first and second reinforcement frames absorb energy while being deformed when the longitudinal direction load P3 is applied from a rear bumper side.

The vehicle body structure according to a form of the present disclosure can be equipped with the battery having a large capacity while reducing the occupancy of the passenger and cargo spaces because the vehicle body structure includes the battery mounting portion provided at the rear of a rear seat and a recess recessed downward to receive a lower side of the battery in a rear floor panel.

The vehicle body structure according to a form of the present disclosure can inhibit a phenomenon in which the battery is lifted by inertia even if a front collision occurs in a vehicle because the upper fixing portion for fixing an upper portion of the battery is supported by seat rails of the rear seat.

The vehicle body structure according to a form of the present disclosure can reduce the restrictions on the installation and movement of the rear seat despite the installation of the battery having a large capacity, and inhibit the interference between a propeller shaft and the battery when a 4WD is applied, because the battery mounting portion is provided at the rear of the rear seat.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A vehicle body structure for a vehicle having a battery and a rear seat, the vehicle body structure comprising:
   a battery mounting portion provided on a floor in a rear of the rear seat and on which the battery is mounted;
   a cross member configured to reinforce the floor in a front of the battery mounting portion;
   a left rear side member and a right rear side member positioned at opposite ends of the cross member;
   a lower reinforcement portion configured to reinforce the floor below the battery mounting portion and to be supported on the cross member and the left and right rear side members; and
   an upper fixing portion fastened to the lower reinforcement portion in a state of fixing the battery,
   wherein the battery mounting portion includes a recess formed to be recessed downward from the floor to receive a lower side of the battery, and
   wherein the lower reinforcement portion includes:
      a first reinforcement frame extending in a lateral direction at a position spaced apart from a rear of the cross member and having opposite ends supported by the left and right rear side members; and
      a plurality of second reinforcement frames extending in a longitudinal direction to connect the cross member and the first reinforcement frame, and disposed to be spaced apart from each other in the lateral direction.

2. The vehicle body structure according to claim 1, wherein the lower reinforcement portion further includes:
   third reinforcement frames extending in the lateral direction and including a right third reinforcement frame and a left third reinforcement frame,
   wherein the right third reinforcement frame connects the right rear side member and a second reinforcement frame which is adjacent to the right rear side member among the plurality of second reinforcement frames, and
   wherein the left third reinforcement frame connects the left rear side member and another second reinforcement frame which is adjacent to the left rear side member among the plurality of second reinforcement frames.

3. The vehicle body structure according to claim 2, wherein
   the upper fixing portion includes:
      a first fixing frame extending in the lateral direction to fix the battery and having opposite ends fastened to the third reinforcement frames;
      a second fixing frame extending in the lateral direction to fix the battery and having opposite ends fastened to the first reinforcement frame; and
      a plurality of third fixing frames extending in the longitudinal direction to fix the battery, coupled to the first and second fixing frames in an intersecting state, and having a front end fastened to the plurality of second reinforcement frames, respectively.

4. The vehicle body structure according to claim 3, wherein the lower reinforcement portion further includes a plurality of reinforcement members provided in the first to third reinforcement frames to reinforce portions to which the first to third fixing frames are fastened, respectively.

5. The vehicle body structure according to claim 3, further comprising
   a plurality of seat rails installed on the floor to guide a movement of the rear seat and fastened to the first fixing frame in a state of extending to the first fixing frame.

6. The vehicle body structure according to claim 1, wherein the first reinforcement frame is provided at a position coincident with a rear end of the battery.

7. The vehicle body structure according to claim 1, further comprising a plurality of buffer frames supported on a rear bumper by extending in a rearward direction, respectively, from positions where the first reinforcement frame and the plurality of second reinforcement frames are connected, and made of a material having a weaker rigidity than the first and second reinforcement frames.

8. The vehicle body structure according to claim 1, further comprising
a plurality of seat rails installed on the floor to guide a movement of the rear seat and fastened to the upper fixing portion in a state of extending above the upper fixing portion.

9. A vehicle comprising the vehicle body structure of claim 1.

10. A vehicle body structure for a vehicle having a battery and a rear seat, the vehicle body structure comprising:
a battery mounting portion provided on a floor in a rear of the rear seat and on which the battery is mounted;
a cross member configured to reinforce the floor in a front of the battery mounting portion;
a left rear side member and a right rear side member positioned at opposite ends of the cross member;
a lower reinforcement portion configured to reinforce the floor below the battery mounting portion and to be supported on the cross member and the left and right rear side members;
an upper fixing portion fastened to the lower reinforcement portion in a state of fixing the battery; and
a plurality of buffer frames supported on a rear bumper by extending in a rearward direction from the lower reinforcement portion, respectively, and made of a material having a weaker rigidity than the lower reinforcement portion,
wherein the battery mounting portion includes a recess formed to be recessed downward from the floor to receive a lower side of the battery.

* * * * *